United States Patent
Ooi et al.

(10) Patent No.: US 7,117,217 B2
(45) Date of Patent: Oct. 3, 2006

(54) APPARATUS AND METHOD FOR PERFORMING TRANSFORMATION-BASED INDEXING OF HIGH-DIMENSIONAL DATA

(75) Inventors: Beng Chin Ooi, Kent Vale (SG); Kian Lee Tan, Singapore (SG); Stephen Bressan, Kent Vale (SG); Cui Yu, Athens, GA (US)

(73) Assignee: National University of Singapore, Singapore (SG)

( * ) Notice: Subject to any disclaimer, the term of this patent is extended or adjusted under 35 U.S.C. 154(b) by 211 days.

(21) Appl. No.: 10/276,357

(22) PCT Filed: Apr. 27, 2001

(86) PCT No.: PCT/SG01/00081
§ 371 (c)(1),
(2), (4) Date: Jun. 4, 2003

(87) PCT Pub. No.: WO01/88656
PCT Pub. Date: Nov. 22, 2001

(65) Prior Publication Data
US 2004/0006568 A1    Jan. 8, 2004

(30) Foreign Application Priority Data
May 15, 2000    (SG) .............................. 200002639-3

(51) Int. Cl.
*G06F 7/00* (2006.01)
*G06F 17/30* (2006.01)
*G06F 17/00* (2006.01)

(52) U.S. Cl. ......................................... 707/100; 707/3
(58) Field of Classification Search ................ 707/100, 707/3
See application file for complete search history.

(56) References Cited

U.S. PATENT DOCUMENTS 6,148,295 A    11/2000   Megiddo et al. ................ 707/3

(Continued)

OTHER PUBLICATIONS

Friedman, et al., "An Algorithm for Finding Nearest Neighbors," IEEE Transaction on Computers, vol. C-24, pp. 1000-10006, Oct. 1975.

(Continued)

*Primary Examiner*—Frantz Coby
*Assistant Examiner*—Cindy Nguyen
(74) *Attorney, Agent, or Firm*—David H. Jaffer; Pillsbury Winthrop Shaw Pittman LLP

(57) ABSTRACT

A method and apparatus for implementation in a database management system transforms high-dimensional data points to a single-dimensional space so that single-dimensional values can be used as representative index keys for high-dimensional data points and a single-dimensional index structure can be employed to index the transformed values. Upon achieving transformed values, known single-dimensional indexing structures can be employed. To achieve transformation from high-dimensions to a single-dimension, attribute values of a data item, each representing a different dimension, are mapped into a range and an integer value is assigned to each dimension. Either the minimum or maximum dimension value for the multi-dimensional data item is selected, and the minimum or maximum dimensional value is added to the integer value. As a result of this transformation, data points are mapped over a range in a single dimension and associated single-dimension values are used as a representative index key for subsequent search queries.

6 Claims, 14 Drawing Sheets

U.S. PATENT DOCUMENTS

| | | | | |
|---|---|---|---|---|
| 6,154,746 | A | * | 11/2000 | Berchtold et al. .......... 707/100 |
| 6,477,553 | B1 | * | 11/2002 | Druck ........................ 708/313 |
| 6,625,611 | B1 | * | 9/2003 | Teig et al. .................. 707/102 |
| 6,834,278 | B1 | * | 12/2004 | Yu et al. ........................ 707/2 |

OTHER PUBLICATIONS

R. Ramarkrishnan, "Database Management Systems," Chapter 5, McGraw-Hill.

Berchtold S. et al., "The Pyramid-Techique: Towards Breaking the Curse of Dimensionality," Sigmod Record, Sigmod, New York, NY, vol. 27, No. 2., Jun. 1, 1998 pp. 142-153.

Bohm, C., et al., "XZ-Ordering: A Space-Filling Curve for Objects With Spacial Extension," 6th International Symposium, SSD'99. Proceedings (Lecture Notes in Computer Science vol. 1651), Proceedings of 6th International Symposium on Spacial Databases, Hong Kong, Jul. 20-23, 1999, pp. 75-90.

* cited by examiner (a) iMax (b) iMin

APPARATUS AND METHOD FOR PERFORMING TRANSFORMATION-BASED INDEXING OF HIGH-DIMENSIONAL DATA

This application is the National Phase of International Application PCT/SG01/00081 filed Apr. 27, 2001 which designated the U.S., and claims priority from Singapore application number 200002639-3, filed May 15, 2000.

BACKGROUND OF THE INVENTION

1. Field of the Invention

The present invention relates to the field of database management, and more particularly to a method and an apparatus for achieving efficient database indexing structures which permit high-speed access to high-dimensional data points from a large repository of points stored in memory.

2. Description of Related Art

Database management systems are widely accepted as a standard tool for manipulating large volumes of data in secondary storage media. To enable fast access to stored data according to its content, databases typically use structures known as indexes. Although indexes are optional because data can always be located by an exhaustive search, indexes are the primary means of reducing the volume of data that must be retrieved and processed in response to a query. Therefore, in practice, large database files must be indexed to satisfy performance requirements.

Recent years have seen an explosive growth in use of new database applications such as CAD/CAM systems, spatial information systems, and multimedia information systems. The needs of these applications are far more complex than traditional business applications. In particular, data objects are typically represented as high-dimensional points. Traditional indexing techniques such as the B-tree and its variants, which are single-dimensional indexing structures, do not efficiently support such new database applications, thereby requiring the design of new and more complex indexing mechanisms.

Consequently, many indexing methods for multi-dimensional data have been developed, including hierarchical tree structures (such as R-trees), linear quad-trees, and grid-files. Although hierarchical tree structures perform well when the tree nodes exhibit a large degree of fan-out, with an increasing number of dimensions, a low degree of fan-out contributes to increased overlap between node entries and increased tree height, resulting in rapid deterioration in performance. Linear quad-trees and grid-files also work well for low dimensionalities, but the response time explodes exponentially for high dimensionalities. In fact, for high dimensionality, sequential scanning becomes more efficient.

Recent efforts have sought to address these problems by reducing the dimensionality of the indexing attribute so that one direction corresponds to projecting high-dimensional points on a hyperplane containing the axis. One such method (e.g., that disclosed by Friedman, et al. *An Algorithm For Finding Nearest Neighbors*, IEEE Transaction on Computers, Vol C-24, pp.1000–1006) truncates high dimensional data. Searching on projections, however, produces false drops, which can reduce the effectiveness of the technique. Another recent method groups high-dimensional data into smaller buckets so that a search can be performed by sequentially scanning the smaller number of buckets. This approach is not expected to scale for large amounts of high-dimensional data, as the number of buckets will be too large to allow efficient searching.

Therefore, there is a need for indexing technique which reduces the dimensionality of a high-dimensional database, while at the same time ensuring that objects are not missed and false drops do not frequently occur when answering a query.

SUMMARY OF THE INVENTION

According to one aspect of the present invention, there is provided a method of managing a database which stores high-dimensional data items, comprising: applying a transform function to a high-dimensional data item to map the high-dimensional data item to single-dimensional space, thereby obtaining a single-dimensional value which represents the high-dimensional data item; and indexing the single-dimensional value obtained by said applying step using a single-dimensional index structure; wherein the high-dimensional data item includes a plurality of attribute values, each attribute value corresponding to a different dimension of the high-dimensional data item; and said step of applying a transform function maps each attribute value of the high-dimensional data item to a predetermined range, thereby obtaining a mapped attribute value for each attribute value, and calculates the single-dimensional value which represents the high-dimensional data item as $d_{min}+x_{min}$ or $d_{max}+x_{max}$ where $x_{min}$ is the smallest mapped attribute value associated with the high-dimensional data item, $d_{min}$ is a value associated with the dimension which corresponds to the smallest mapped attribute value, $x_{max}$ is the largest mapped attribute value associated with the high-dimensional data item, and $d_{max}$ is a value associated with the dimension which corresponds to the largest mapped attribute value.

According to another aspect of the present invention, there is provided apparatus for managing a database which stores high-dimensional data items, comprising: transform means for applying a transform function to a high-dimensional data item to map the high-dimensional data item to single-dimensional space, thereby obtaining a single-dimensional value which represents the high-dimensional data item; and indexing means for indexing the single-dimensional value obtained by said transform means using a single-dimensional index structure; wherein the high-dimensional data item includes a plurality of attribute values, each attribute value corresponding to a different dimension of the high-dimensional data item; and said transform means is operable to map each attribute value of the high-dimensional data item to a predetermined range, thereby obtaining a mapped attribute value for each attribute value, and to calculate the single-dimensional value which represents the high-dimensional data item as $d_{min}+x_{min}$ or $d_{max}+x_{min}$ where $x_{min}$ is the smallest mapped attribute value associated with the high-dimensional data item, $d_{min}$ is a value associated with the dimension which corresponds to the smallest mapped attribute value, $x_{max}$ is the largest mapped attribute value associated with the high-dimensional data item, and $d_{max}$ is a value associated with the dimension which corresponds to the largest mapped attribute value.

The present invention can be used to achieve efficient and complete retrieval of high-dimensional points from a database. High-dimensional data points may be mapped to single-dimensional space using a computationally inexpensive transform. In one implementation, data points in d-dimensional space are mapped to a single-dimension using either the value of the dimension with the maximum value or the value of the dimension with the minimum value, such that a value associated with such a maximum or minimum dimension is a representative index key for the high-dimensional point. The transformed values for all data points can be ordered and range queries can be performed on the transformed (single-dimensional) space. Accordingly, single-dimensional indexes can be employed to index the transformed values. For example, the B+-tree structure can be employed since it is supported by all commercial database management systems. Thus, the present invention can be readily adopted for use in known indexing/retrieval systems by determining the way the data is stored in memory, e.g., through the use of B+-tree, and the efficiency of the present invention improves the processing time for retrieving data from secondary memory to the buffer (RAM). In addition to improving the storage and retrieval time of data from secondary memory, buffer space is efficiently used by fetching just enough data for answering user queries.

In one implementation, the transform used by the present invention to map high-dimensional data to single-dimensional space is a "tunable" index scheme, which, by varying a value $\theta$, is able to bias selection to either the dimension with the maximum value or the dimension with the minimum value so as to optimize the distribution of data points over a single dimension.

BRIEF DESCRIPTION OF THE DRAWINGS

Other aspects and advantages of the present invention will become apparent upon reading the following detailed description and upon reference to the drawings in which.

DETAILED DESCRIPTION

The following detailed description relates to a method and an apparatus for indexing high-dimensional datapoints in a database management system by transforming datapoints to single-dimensional values to be used as representative index keys. Illustrative embodiments of the present invention will be described with reference to the accompanying drawings.

Figure 1:
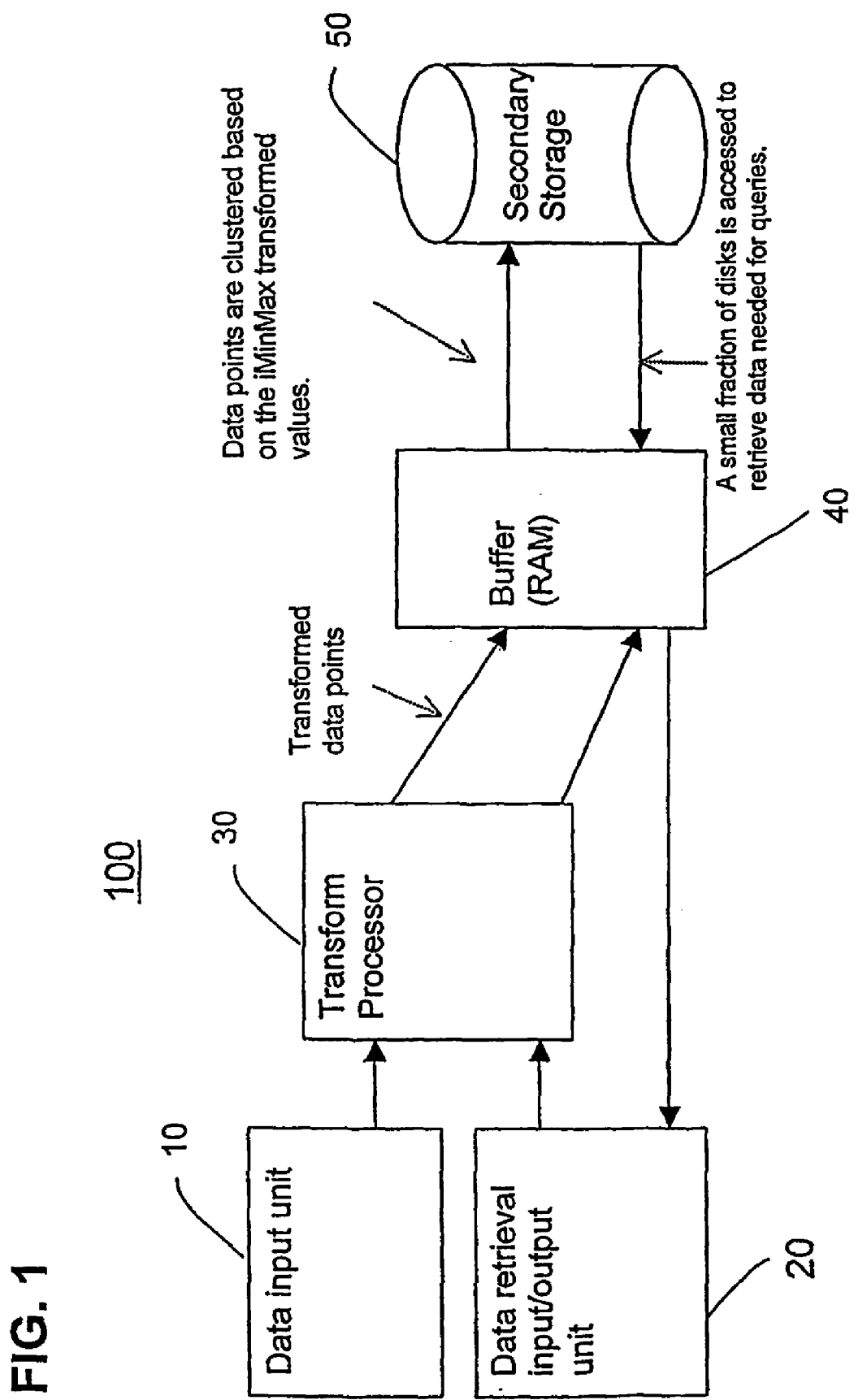
FIG. 1 illustrates a database management system according to an embodiment of the present invention.

FIG. 1 illustrates a database management system 100 which is suitable for implementing embodiments of the present invention, and which includes: a data input unit 10 for inputting data to be indexed and stored by the database management system; a data retrieval input/output unit 20 for inputting search queries for data retrieval and outputting query results; a transform processor 30 for transforming high-dimensional data points received from the data input unit 10 and high-dimensional queries received from the data retrieval input/output unit 20; a buffer 40, e.g., Random Access Memory (RAM), for storing transformed data points and queries resulting from the transform processor for outputting transformed data points to a secondary storage 50, such as a disk memory, and retrieving data points from the secondary storage 50 based on the transformed queries. It should be realized that the configuration shown in FIG. 1 is for illustrative purposes to illustrate the flow of data for storage and retrieval, and that the present invention may be implemented to improve any existing database management system, for example one which utilizes a database server which has the ability of handling multiple databases.

As shown in FIG. 1, there are two functional parts of the database management system 100: storage of data and retrieval of data. When high-dimensional points received from data input unit 10 have to be stored, the transform processor 30 first transforms by a mapping function, referred to herein as iMinMax($\theta$), into single dimensional values in buffer 40. These single-dimensional values are then inserted into a secondary storage 50, such as in the form of a disk-based B+-tree. Since a single-dimensional indexing structure, like a B+-tree, clusters data that has similar values together, this effectively clusters high-dimensional points that are related. On the other hand, when retrieving data, a query (also in high-dimensional space) from the data retrieval input/output unit 20 will also be transformed using iMinMax($\theta$) into a set of subqueries in single-dimension space in-buffer 40. These subqueries are then used to access the data from the secondary storage 50. Only a fraction of the secondary storage 50 will be searched, and only the relevant portions of the pages stored in secondary storage 50 will be transferred into buffer 40. The relevant data is refined and returned to the data retrieval input/output as answers to the data retrieval input/output unit 20.

The following discussion and illustrative examples demonstrates the operation performed by the transform processor 30 using iMinMax($\theta$).

In the following discussion, we consider a unit of d-dimensional space, e.g., points are in the space ([0,1], [0,1], . . . ,[0,1]). In other words, all attribute values of multi-dimensional data points are mapped for example into a [0,1] domain. An arbitrary data point in the space is represented as $x=(x_1,x_2, \ldots ,x_d)$. Furthermore, let $x^{max}=\max_{i=1}^{d} x_i$ and $x_{min}=\min_{i=1}^{d} x_i$ be the maximum value and minimum value among the dimensions of the point. Moreover, $d_{max}$ and $d_{min}$ denote the dimensions at which the maximum and minimum values occur. A range query is represented by $q=([x_{11},x_{12}],[x_{21},x_{22}], \ldots ,[x_{d1},x_{d2}])$ and ans(q) denotes the answers produced by evaluating a query q.

1. Transforming High-Dimensional Data to Single-Dimensional Space

The transform function used in an exemplary implementation of the present invention, iMinMax($\theta$), adopts a simple mapping function that is computationally inexpensive. Specifically, a data point x is mapped to a point y over a single dimensional space as follows:

$$y = \begin{cases} d_{\min} + x_{\min} & \text{if } x_{\min} + \theta < 1 - x_{\max} \\ d_{\max} + x_{\max} & \text{otherwise} \end{cases} \quad (1)$$

where θ is a real number. The result of formula (1) is best illustrated by the following example in which θ is 0. For this example, we consider the following Employee database with three data items, or records, each having three attribute fields—salary, age, and competency:

| Employee Id | Salary | Age | Competency |
|---|---|---|---|
| e1 | 50,000 | 30 | 0.4 |
| e2 | 70,000 | 40 | 0.6 |
| e3 | 80,000 | 50 | 0.7 |

In this example, the domain of Salary is a number between 30,000 to 100,000; the domain of Age is a number from 20 to 70, and the domain of Competency is a real number between 0 and 1. To index Employee data based on (Salary, Age, Competency), the attribute values are first mapped into a [0,1] range. Furthermore, an integer value is assigned to each attribute type (i.e., dimension). In this example, 0, 1 and 2 are assigned to represent the dimension (i) of salary, age and competency respectively. Applying equation (1) to this example, the following values result. Mapping the attribute values to the [0,1] range, and then applying

| Employee Id | Salary (x-30,00)/1000,000–30,000 | Age (x-20)/(70-20) | Competency | Index value (i + chosen value) |
|---|---|---|---|---|
| e1 | 0.285 | 0.2 | 0.4 | 1.2 |
| e2 | 0.571 | 0.4 | 0.6 | 2.6 |
| e3 | 0.714 | 0.6 | 0.7 | 0.714 |

Based on iMinMax, with θ=0.0, e1 is indexed using the corresponding Age attribute value, e2 is indexed using the corresponding Competency attribute value, and e3 is indexed using the corresponding Salary attribute value, and the respective dimension value (i) is added thereto.

Figure 2A:
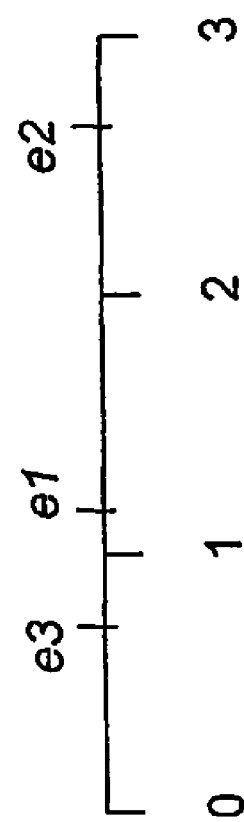
FIG. 2A illustrates an example of a distribution of data points in three-dimensional space.
Figure 2B:
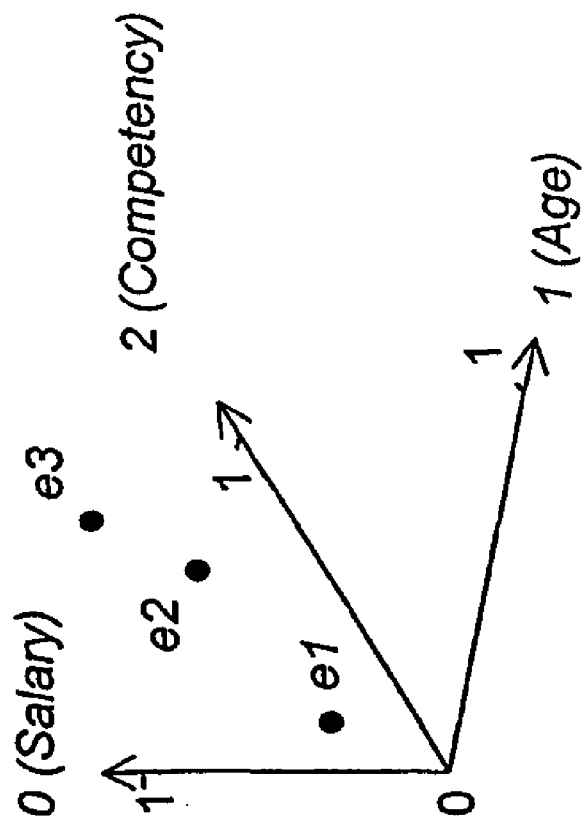
FIG. 2B illustrates an exemplary mapping of the three-dimensional data points of FIG. 2A to a single dimension according to an embodiment of the present invention.

FIGS. 2A–2B illustrate this simple transformation of data points with 3 indexed attributes to data points indexed by a single value. As seen in these figures, the basic idea of iMinMax is to distribute high-dimensional data points In a single-dimensional space so that they can be searched and retrieved efficiently. This is realized by three beneficial properties of iMinMax. First, θ can be relied on to influence the number of points falling on each index hyperplane. In fact, θ is the "tuning knob" that affects the hyperplane on which an index point should reside. To illustrate this, take a data point (0.2, 0.75) in 2-dimensional space for example. With θ=0.0, the index point will reside on the Min edge according to equation (1). By setting θ to 0.1, however, the index point will be pushed to reside on the Max edge. The higher the value of θ≧0, the greater the bias the function expresses towards the Max edge. When θ=0.1, the Max edge has the preference of about 10% more. Similarly, the transformation can "favor" the Min edge using θ<0. In fact, at one extreme, when θ≧1.0, the transformation maps all points to their Max edge and by setting θ≦−1.0, the values at the Min edge are always chosen as the index key. For simplicity, we denote the former extreme as iMax and the latter extreme as iMin, and any other variation as iMinMax (dropping θ unless its value is critical).

As a second property of iMinMax, the transformation actually splits the (single-dimensional) data space into different partitions based on the dimension which has the largest value or smallest value, and provides an ordering within each partition. This is affected by including the dimension at which the maximum value occurs, i.e., the first component of the mapping function.

Finally, the unique tunable feature facilitates the adaptation of iMinMax(θ) to data sets of different distributions (i.e., uniform or skewed). In cases where data points are skewed toward certain edges, these points may be "scattered" to other edges to achieve even distribution by making a choice between $d_{min}$ and $d_{max}$. Statistical information such as the number of index points can be used for such a purpose. Alternatively, one can either use the information on the data distribution or information collected to categorically adjust the partitioning. As discussed below, the trade off of a dynamic θ is that certain queries cannot be pruned.

2. Mapping Range Queries

Range queries in the original d-dimensional space must be transformed to the single-dimensional space for evaluation. In iMinMax(θ), the original query in the d-dimensional space is mapped into d subqueries—one for each dimension. These subqueries are denoted as $q_1, q_2, \ldots, q_d$, where $q_i = [l_i, h_i]$, $1 \leq i \leq d$. For the jth query subrange in q, $[x_{j1}, x_{j2}]$, we have:

$$q_j = \begin{cases} [j + \max_{i=1}^d x_{i1}, j + x_{j2}] & \text{if } \min_{i=1}^d x_{i1} + \theta \geq 1 - \max_{i=1}^d x_{i1} \\ [j + x_{j1}, j + \min_{i=1}^d x_{i2}] & \text{if } \min_{i=1}^d x_{i2} + \theta < 1 - \max_{i=1}^d x_{i2} \\ [j + x_{j1}, j + x_{j2}] & \text{otherwise} \end{cases} \quad (2)$$

The union of the answers from all subqueries provides a candidate answer set from which the query answers can be obtained, i.e., $$ans(q) \subseteq \bigcup_{i=1}^d ans(q_i).$$

The following "Theorems" illustrate some interesting results achieved upon mapping range queries.

Theorem 1 Under the iMinMax(θ) scheme of the present invention, $$ans(q) \subseteq \bigcup_{i=1}^{d} ans(q_i).$$

Moreover, there does not exist $q_i'=[l_i',h_i']$, where $l_i'>l_i$ or $h_i'<h_i$ for which $$ans(q) \subseteq \bigcup_{i=1}^{d} ans(q'_i)$$

always holds. In other words, $q_i$ is "optimal", and narrowing its range may miss some of q's answers.

In an actual implementation, the nodes of the single-dimensional indexing structure, e.g., the leaf nodes of a B+-tree, will contain the high-dimensional point. In other words, even though the index key on the B+-tree is only a single dimension, the leaf node entries contain the tuple $(x_{key}, x, ptr)$, where $X_{key}$ is the single-dimensional index key of point x and ptr is the pointer to the data page containing other information that may be related to the high-dimensional point. Therefore, any false drop which occurs as a result of Theorem 1 affects only the vectors used as index keys, rather than the actual data itself.

Theorem 2 given a query q, and the subqueries $q_1, q_2, \ldots, q_d$, $q_i$ need not be evaluated if any of the followings holds:

$$\min_{j=1}^{d} x_{j1} + \theta \geq 1 - \max_{j=1}^{d} x_{j1} \text{ and } h_i < \max_{j=1}^{d} x_{j1} \quad (i)$$

$$\min_{j=1}^{d} x_{j2} + \theta < 1 - \max_{j=1}^{d} x_{j2} \text{ and } l_i > \max_{j=1}^{d} x_{j2} \quad (ii)$$

To demonstrate Theorem 2 the following example is given: Let $\theta=0.5$ and consider the range query ([0.2,0.3]; [0.4,0.6]) in 2-dimensional space. Since 0.2+0.5>1-0.4=0.6, all points that satisfy the query fall on the Max edge. This means that the lower bound for the subqueries should be 0.4, i.e., the two subqueries are respectively [0.4,0.3] and [0.4, 0.6]. Since the first subquery's upper bound (i.e, 0.3) is smaller than 0.4, it need not be evaluated because no points will satisfy the query.

Theorem 3, given a query q, and the subqueries $q_1, q_2, \ldots, q_d$, at most d subqueries need to be evaluated.

Note that Theorem 2 assumes that a fixed $\theta$ is used throughout the life span of the index. That is, $\theta$ cannot be dynamically tuned. Fortunately, dynamic tuning of indexes will not be a common practice in the real world and is not cost effective. From Theorem 2 and Theorem 3, the effectiveness of iMinMax($\theta$) can be seen because, for very high dimension spaces, we can expect significant savings from the pruning of subqueries.

Figure 3A:
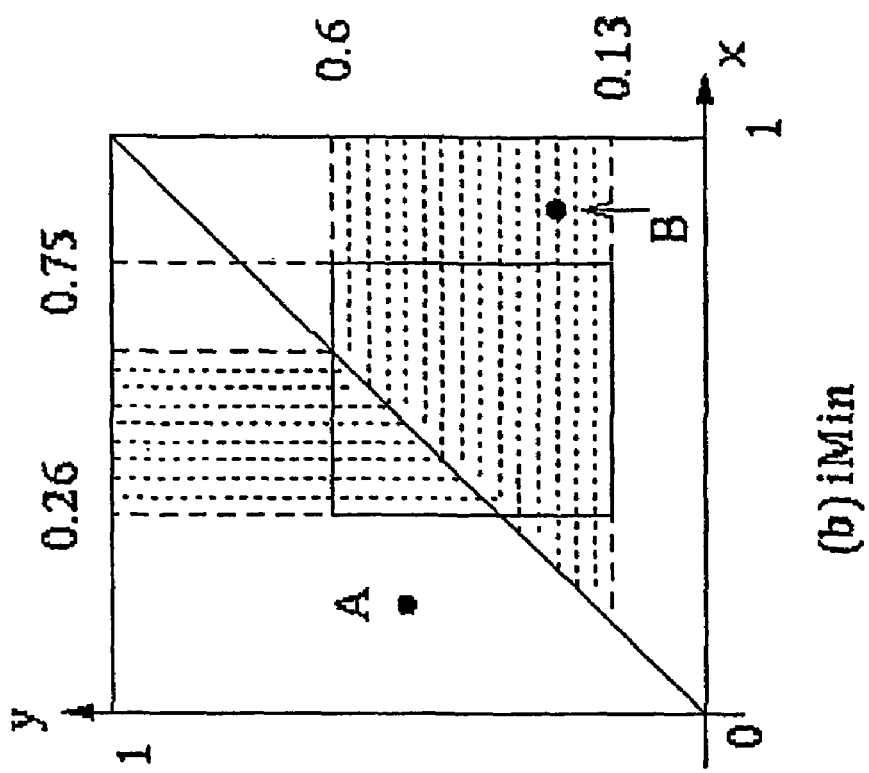
FIGS. 3A–3B illustrate examples of search space for 2-dimensional space.
Figure 3B:
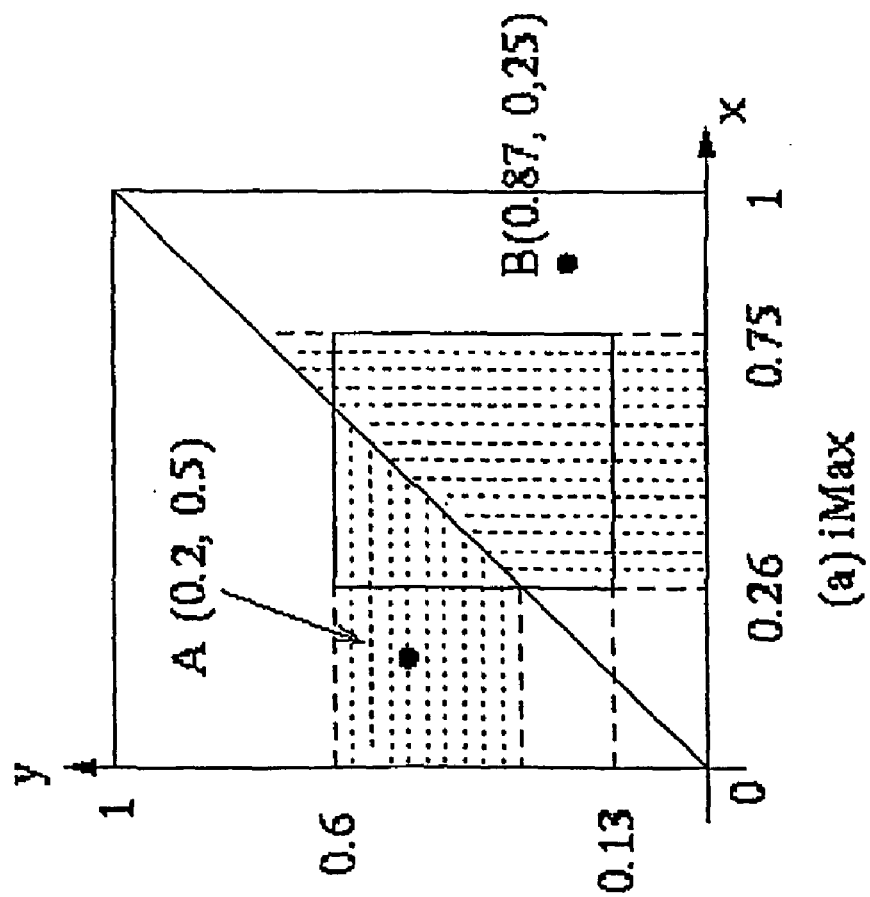

As an example, FIGS. 3A–3B illustrates how iMinMax can keep out points from the search space. Here, we have two points A(0.2,0.5) and B(0.87,0.25) in 2-dimensional space. If we employ either iMax or iMin, at least one false drop will occur. On the other hand, using iMinMax(0.5) effectively keeps both points out of the search space.

3. iMinMax($\theta$) Algorithms

In an exemplary implementation of iMinMax($\theta$), a B+-tree is adopted (such as disclosed in D. Corner. *The Ubiquitous B-tree*. ACM Computing Surveys. 11(2), 121–137, 1979) as the underlying single-dimensional index structure. Entries at the internal nodes are of the form (key, ptr), where key is a single-dimensional value, and ptr is a pointer to its child node at the next level of the tree.

However, for greater efficiency, leaf nodes also store the high-dimensional key, i.e., leaf node entries are of the form (key, v, ptr), where key is the single-dimensional key, v is the high-dimensional key whose transformed value is key, and ptr is the pointer to the data page containing information related to v. Keeping v at the leaf nodes can minimize page accesses to non-matching points. We note that multiple high-dimensional keys may be mapped to a single key value.

By using a known single-dimensional index structure, i.e., B+-tree in this example, the algorithms for searching, inserting and deleting data points are similar to well known algorithms. Additional complexity arises only because we have to deal with the additional high-dimensional key (besides the single-dimensional key value). Exemplary search algorithms (for both point and range queries) are described below to illustrate that this additional complexity can easily be addressed. Insert and delete algorithms can be found in (R. Ramakrishnan, *Database Management Systems*. McGraw-Hill. 1997).

3.1 Point Search Algorithm

Figure 4:
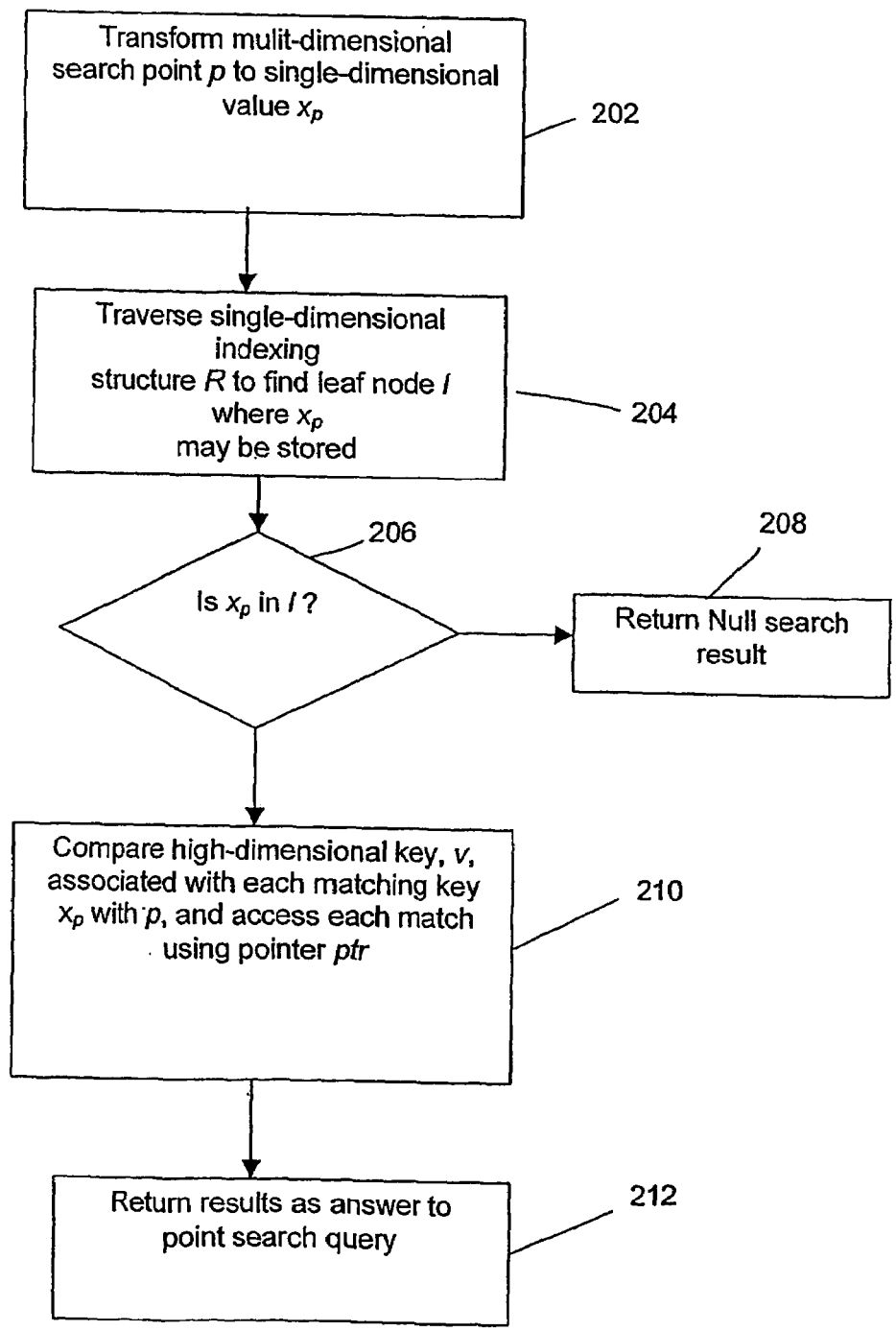
FIG. 4 is a flow diagram illustrating a point search algorithm according to an embodiment of the present invention.

In point search, a point is issued and all matching tuples are to be retrieved. An algorithm for a point search is summarized in the flow-diagram of FIG. 4. The algorithm first maps a multi-dimensional search point p to the single-dimensional key, $x_p$, using the transform described above (step 202). The previously generated index structure, e.g., the B+-tree, is then traversed (step 204) to the leaf node where $x_p$ may be stored. If the point does not exist, then a NULL value is returned (steps 206–208). Otherwise, for every matching $x_p$ value, the high-dimensional key of the data is compared with p for a match and those that match are accessed using the pointer value (step 210). Otherwise, they are ignored. We note that it is possible for a sequence of leaf nodes to contain matching key values and hence they all have to be examined. The final answers are then returned (step 212).

3.2 Range Search Algorithm

Figure 5:
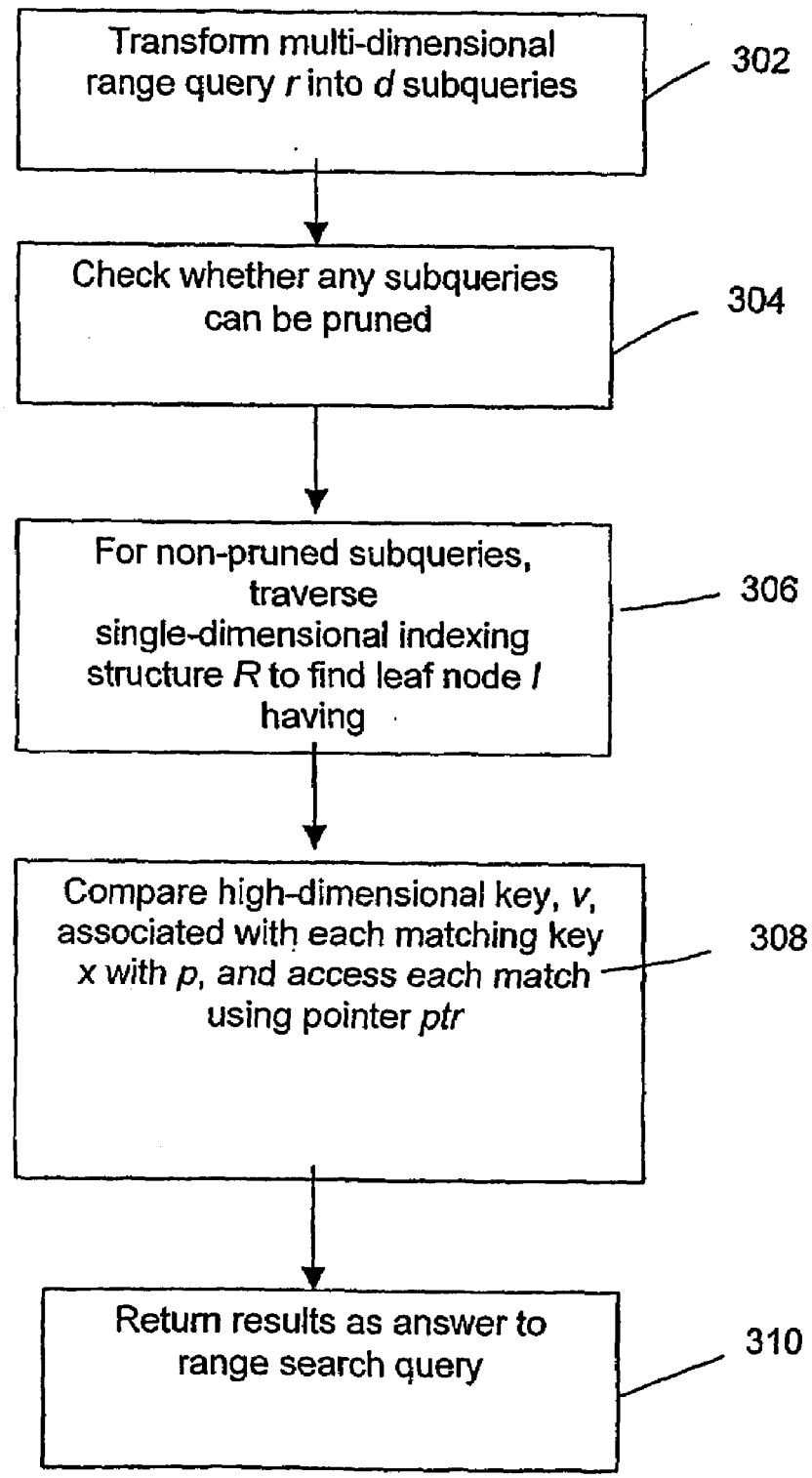
FIG. 5 is a flow diagram illustrating a range search algorithm according to an embodiment of the present invention.

Range queries are slightly more complicated than point searches. FIG. 5 is a flow-diagram which summarizes an exemplary range search algorithm. Initially, let us assume that there are d dimensions. Unlike point queries, a range query r is transformed into d subqueries (step 302). A range query $r=([x_{11}, x_{12}], [x_{21}, x_{22}], \ldots)$. The ith subquery is denoted as $r_i=[l_i,h_i]$. Next, a routine prune Subquery is invoked to check if $r_i$ can be pruned (step 304). If it can be pruned, then it is ignored. Otherwise, the subquery is evaluated as follows. The B+-tree is traversed to the appropriate leaf node (step 306). If there are no points in the range of $r_i$, then the subquery stops. Otherwise, for every $x \in [l_i,h_i]$, the high-dimensional key of the data is compared with p for a match and those that match are accessed using the pointer value (step 308). As in a point search, multiple leaf pages may have to be examined. Once all subqueries have been evaluated, the final answers are then returned (step 310).

4. Performance Study

To analyze performance, iMinMax($\theta$) and a Pyramid technique (as disclosed by S. Berchtold, et al., *The Pyramid-Technique: Towards Breaking the Curse of Dimensionality*, SIGMOD'98, 142–153, 1998) were implemented in C, and the B+-tree was used as the single-dimensional index structure. Each index page was a 4 KB page, and no data pages were buffered. Therefore, every page touched incurred an I/O. However, it should be noted that the traversal paths of the d subqueries generated by iMinMax(θ) do not overlap and hence share very few common internal nodes. This is also true for the subqueries generated by the Pyramid technique. For iMinMax, the pruning outlined in Theorem 2 was not implemented.

Numerous experiments were conducted to analyze performance, with some of the more interesting results on range queries being summarized below. A total of 500 range queries were used for these experiments. Each query is a hyper-cube and has a default selectivity of 0.1% of the domain space ([0,1],[0,1], . . . ,[0,1]). The query width is the d-th root of the selectivity: $\sqrt[d]{0.001}$.

For a 40-dimensional space, the query width is 0.841, which is much larger than half of the extension of the data space along each dimension. Different query sizes will be used for non-uniform distributions. The default number of dimensions used is 30. Each I/O corresponds to the retrieval of a 4 KB page. The average I/O cost of the queries is used as a performance measure.

4.1 Effect of Dimensions

Figure 6A:
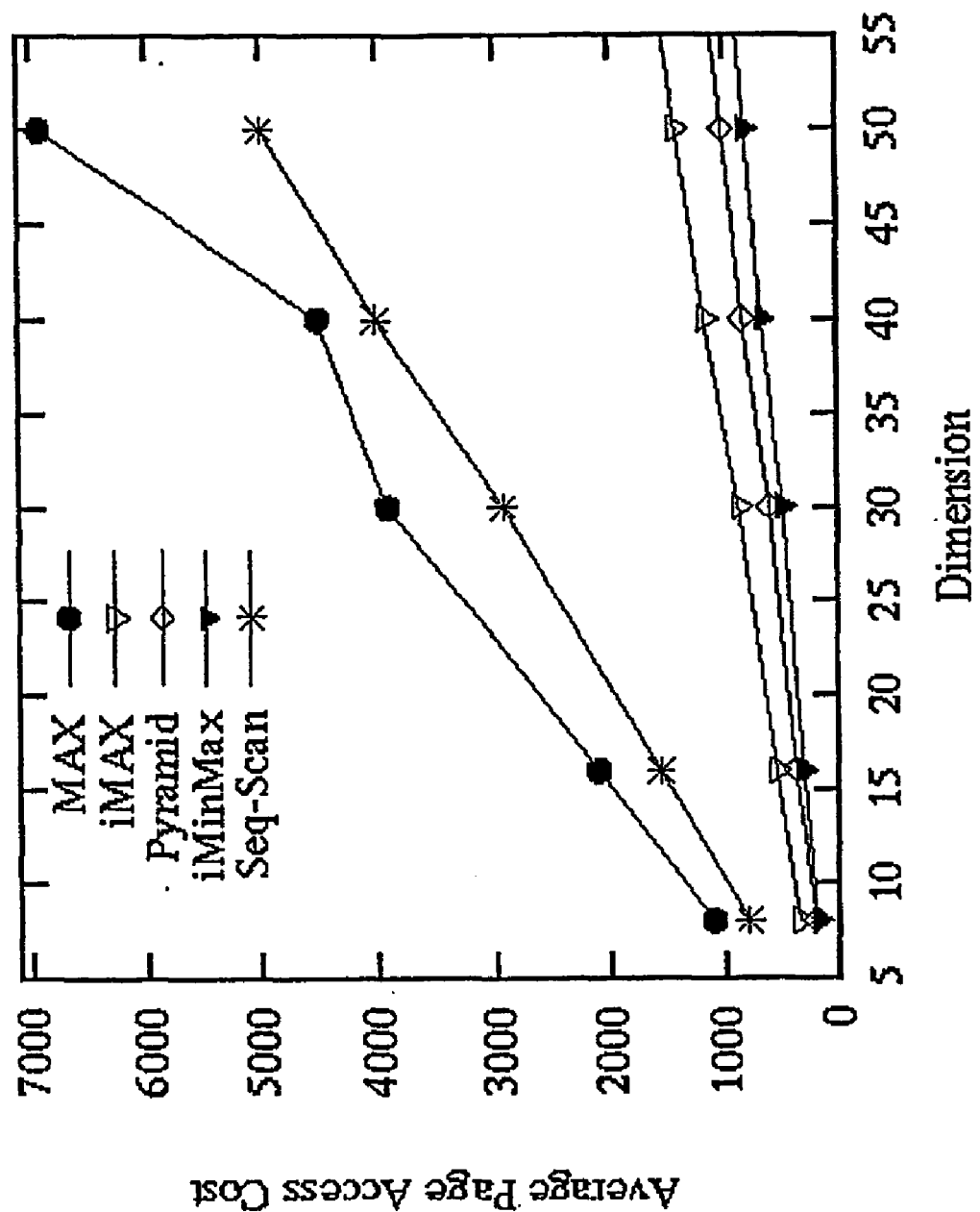
FIGS. 6A–6B are graphs illustrating the effectiveness of an implementation of the present invention based on varying the number of dimensions.

In the first set of experiments, the number of dimensions is varied from 8 to 50. The data set is uniformly distributed over the domain space. There are a total of 100K points. In the first experiment, besides the Pyramid scheme, we also compare against the MAX scheme and the sequential scan (seq-scan) technique. The MAX scheme is the simple scheme that maps each point to its maximum value. However, the transformed space is not partitioned. Moreover, two variations of iMinMax(θ) are used, namely iMax (i.e., θ=1) and iMinMax(θ=0.0)(denoted as iMinMax). FIG. 6A shows the results. First, we note that both the MAX and seq-scan techniques perform poorly, and their I/O cost increases with the higher number of dimensions. MAX performs slightly worse because of the additional internal nodes to be accessed and the high number of false drops.

Figure 6B:
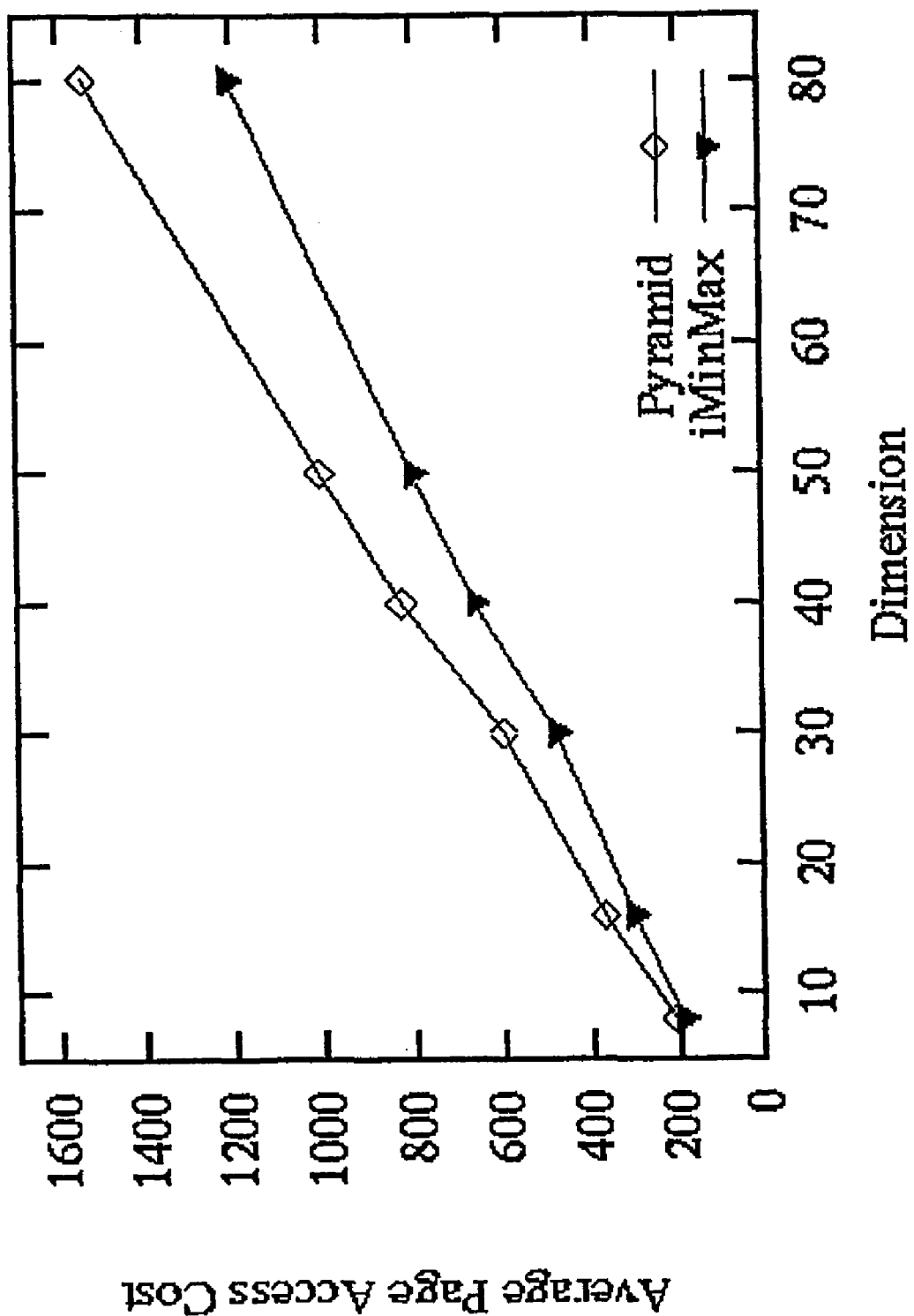

Second, while the number of I/Os for iMinMax, iMax and Pyramid also increases with increasing number of dimensions, the number grows at a much slower rate. Third, we see that iMinMax performs the best, with Pyramid following closely, and iMax performing worse than Pyramid. iMinMax outperforms the iMax and Pyramid since it can prune away some subqueries and its search space touches fewer points. Based on the above results, for all subsequent experiments described below, study is restricted to iMinMax and Pyramid techniques. The results of further evaluation of Pyramid and iMinMax are shown in FIG. 6B. It can be seen from this figure that iMinMax remains superior, and can outperform Pyramid by up to 25%.

4.2 Effect of Data Set Sizes and Query Sizes

Figure 7A:
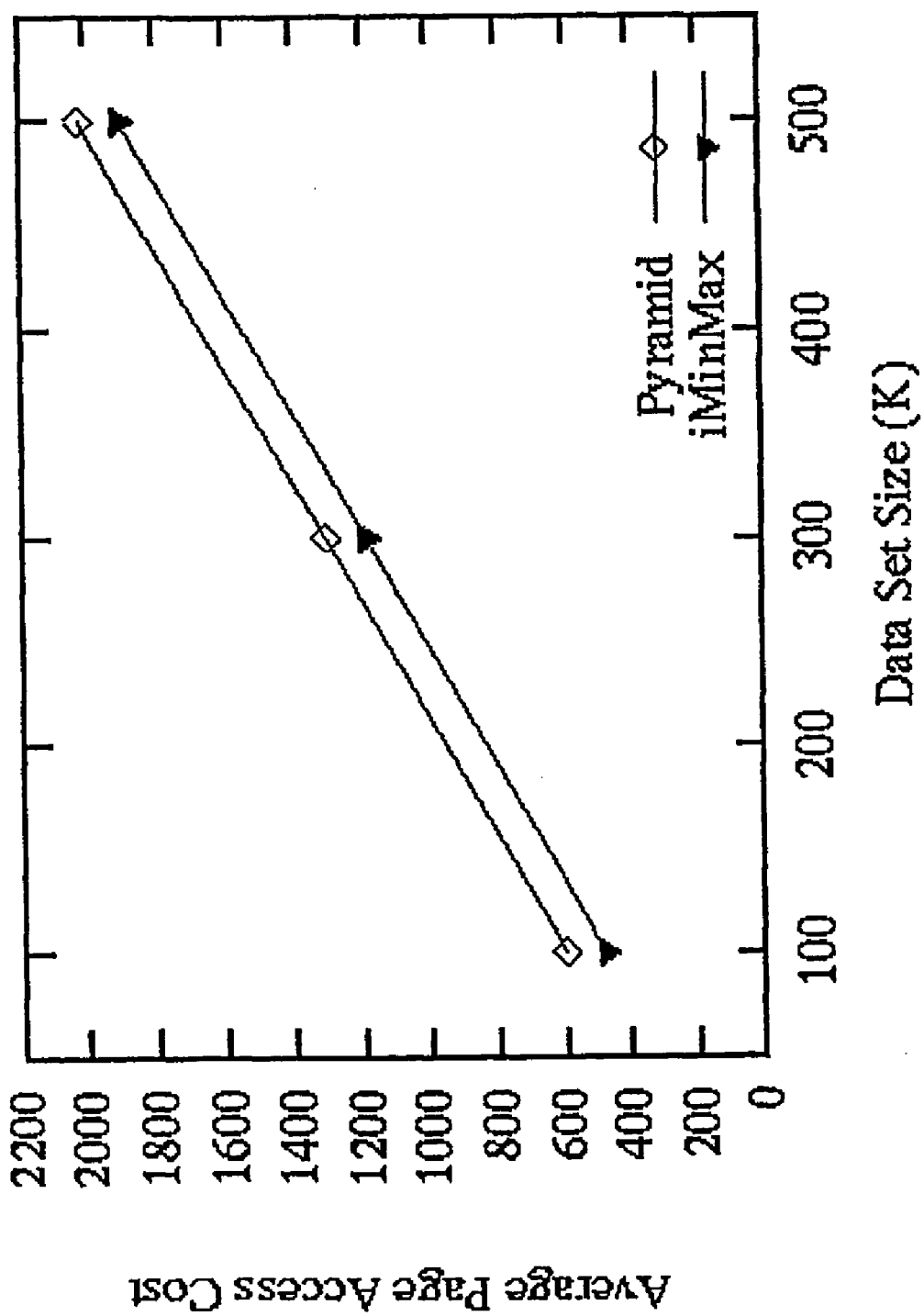
FIGS. 7A–7B are graphs illustrating the effectiveness of an implementation of the present invention based on data set size and selectivity respectively.
Figure 7B:
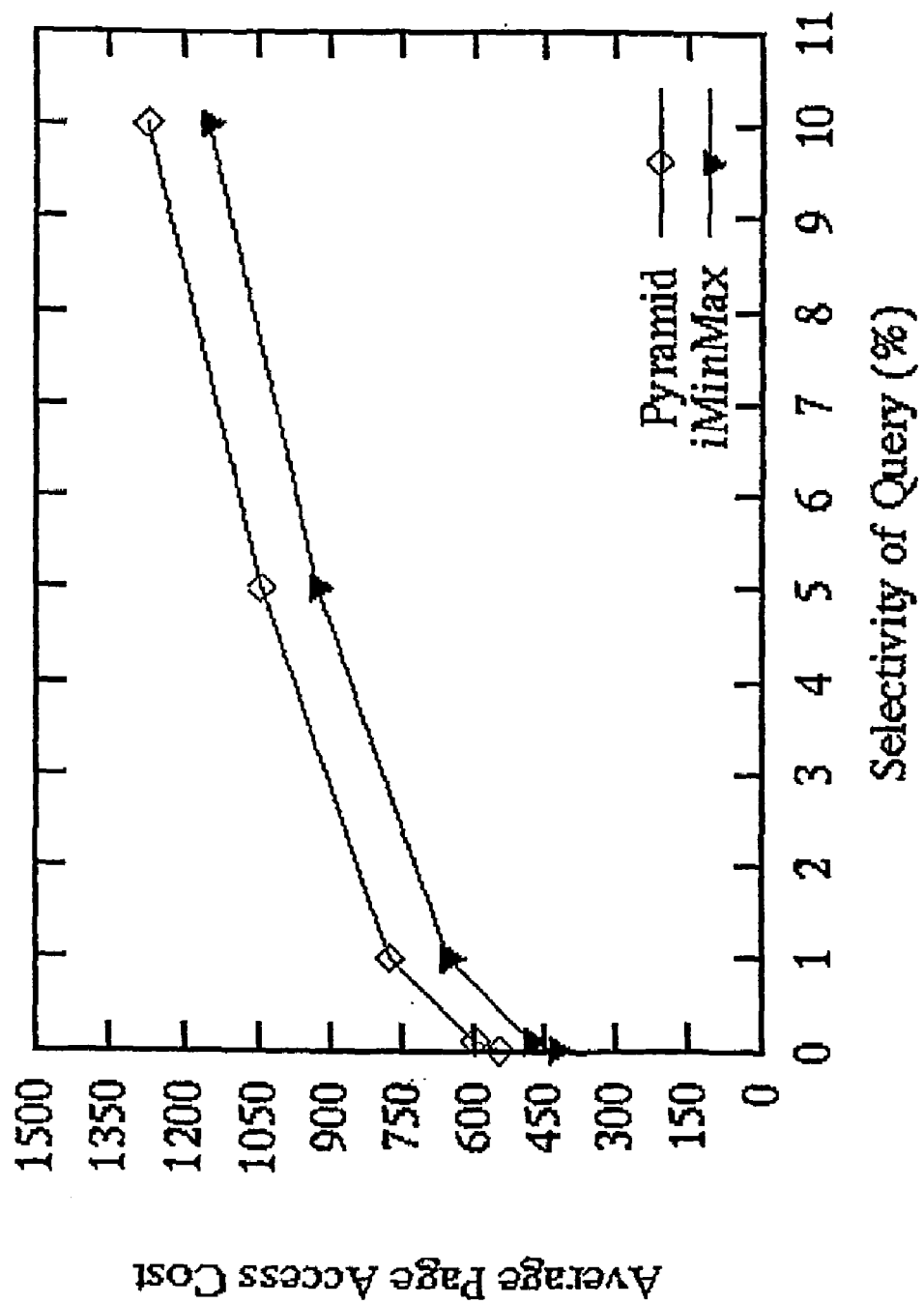

In this set of experiments, different factors are studied, including the data set sizes, and the query selectivities. For both studies, the number of dimensions is fixed at 30. FIG. 7A shows the results when the data set sizes vary from 100K to 500K points. FIG. 7B shows the results when the query selectivities, vary from 0.01% to 10%.

As expected, both iMinMax and Pyramid incurred higher I/O cost with increasing data set sizes as well as the query selectivities. As before, iMinMax remains superior over the Pyramid scheme. It is interesting to note that the relative difference between the two schemes seems to be unaffected by the data set sizes and query selectivities. Upon investigation, both iMinMax and Pyramid return the same candidate answer set. The improvement of iMinMax stems from its reduced number of subqueries compared to the Pyramid scheme.

4.3 Effect of Data Distributions

Figure 8A:
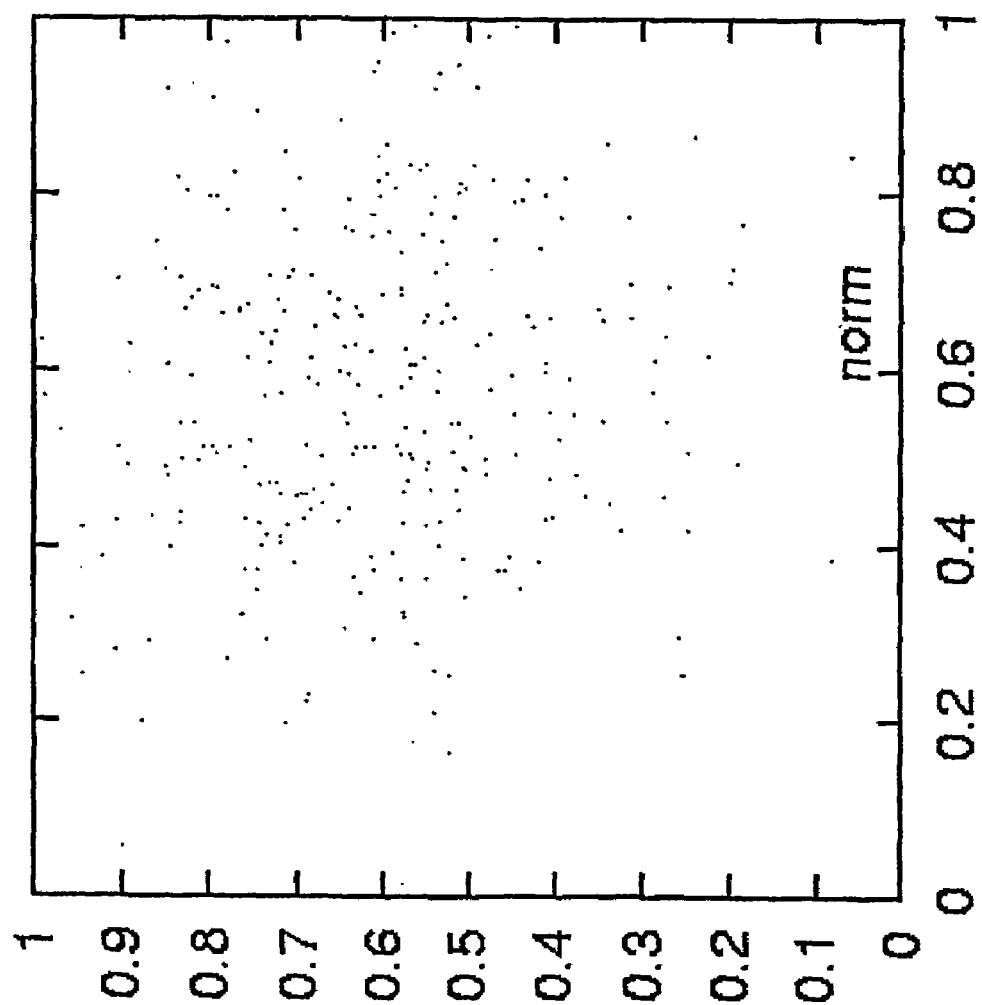
FIGS. 8A–8B are data distribution graphs showing the effect of $\theta$ on a skewed normal distribution and a skewed exponential distribution respectively.
Figure 8B:
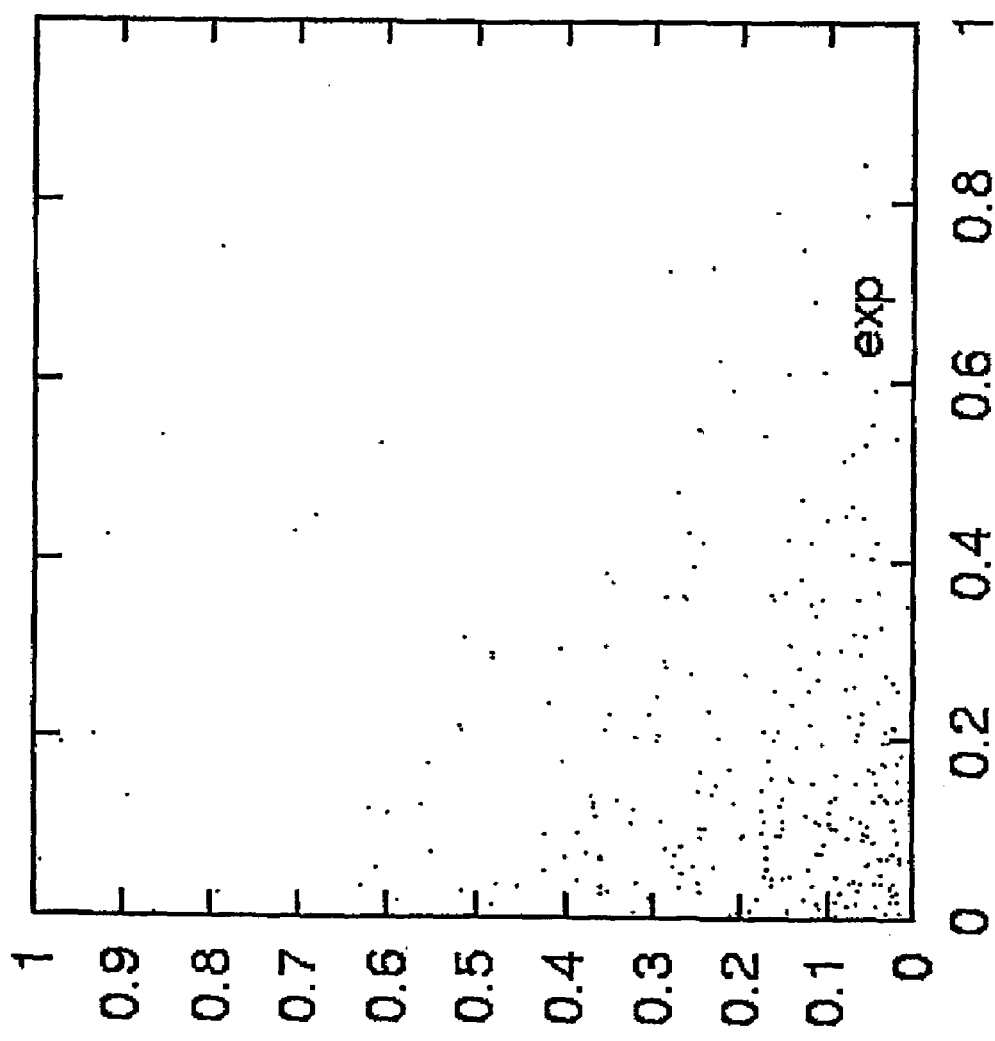

In this experiment, relative performance of iMinMax and Pyramid is studied on skewed data distributions. The results on two distributions, namely skewed normal and skewed exponential are shown. FIGS. 8A-8B illustrate the data distributions in 2-dimensional space.

The first set of experiments studies the effect of θ on skewed normal distribution. For normal distribution, the closer the data center is to the cluster center, the more points can be evenly assigned to each edge. For queries that follow the same distribution, the data points will have the same probability of being kept far from the query cube. In these experiments, each dimension of the query Is fixed to have a width of 0.4.

Figure 9A:
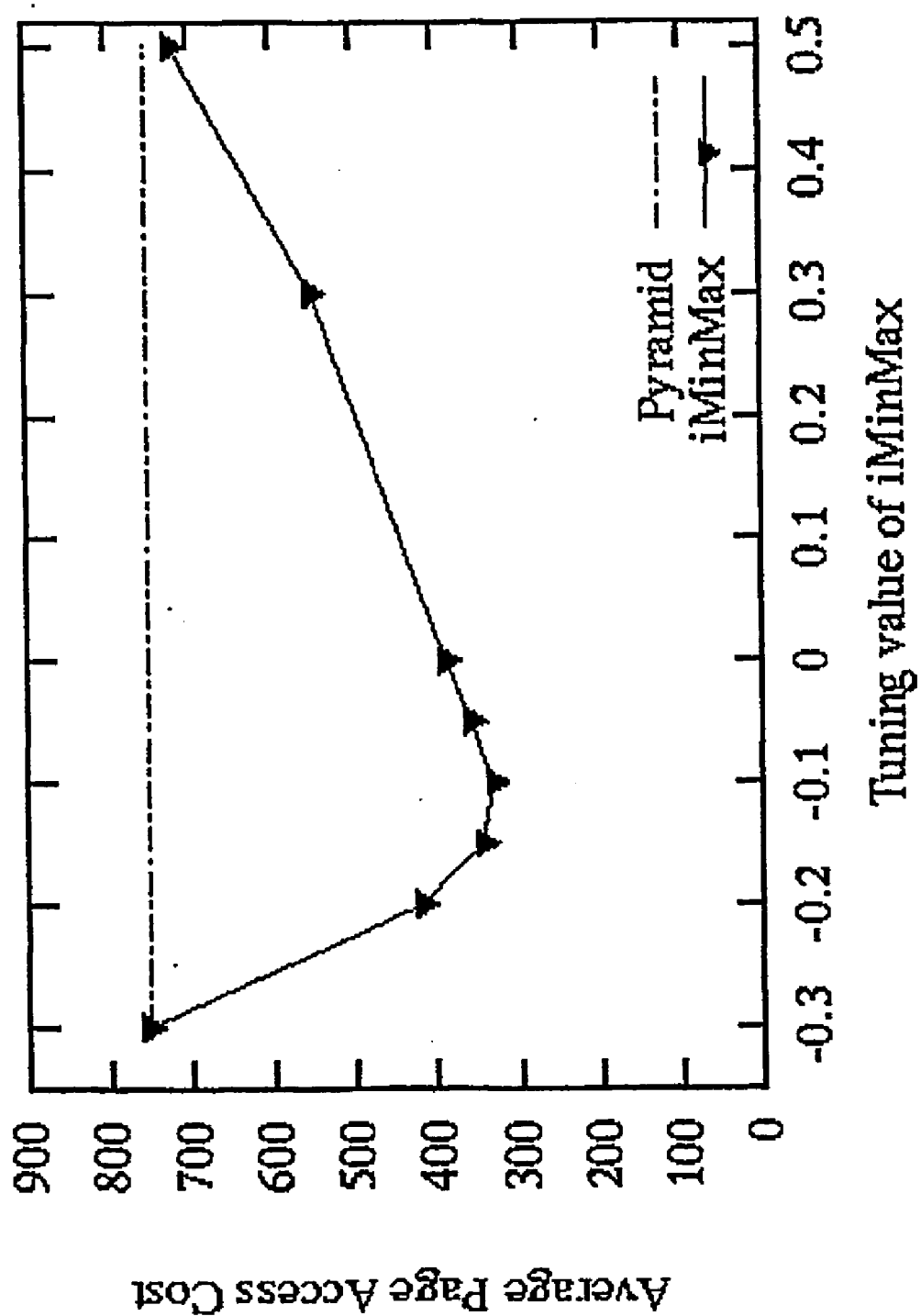
FIGS. 9A–9B are graphs illustrating the effect of varying $\theta$ on efficiency.

FIG. 9A shows the results for 100K 30-dimensional points. First, FIG. 9A shows that for iMinMax, there exists a certain optimal θ value that leads to the best performance. Essentially, θ "looks out" for the center of the cluster. Second, iMinMax can outperform the Pyramid technique by a wide margin (more than 50%). Third, iMinMax can perform worse than the Pyramid scheme when the distribution of points to the edges becomes skewed, and a larger number of points have to be searched. Because of these factors, it is important to fine tune θ for different data distributions in order to obtain optimal performance. This tuning can be easily performed by varying θ.

Figure 9B:
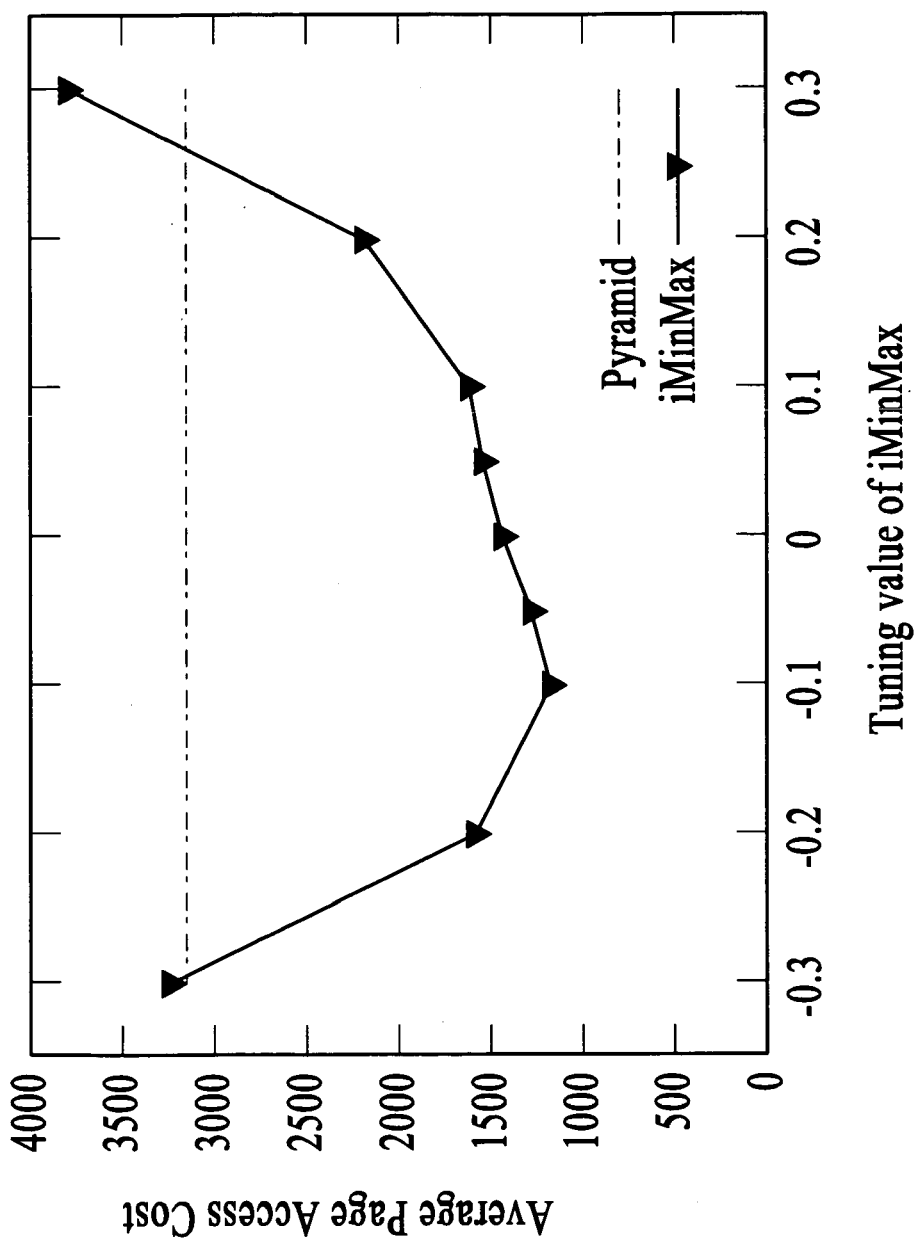

In FIG. 9B, the results for 500K 30-dimensional points are shown. As in the earlier experiment, iMinMax's effectiveness depends on the θ value set. FIG. 9B demonstrates that iMinMax performs better than Pyramid over a wider range of tuning factors, and over a wider margin (more than 66%).

Figure 10:
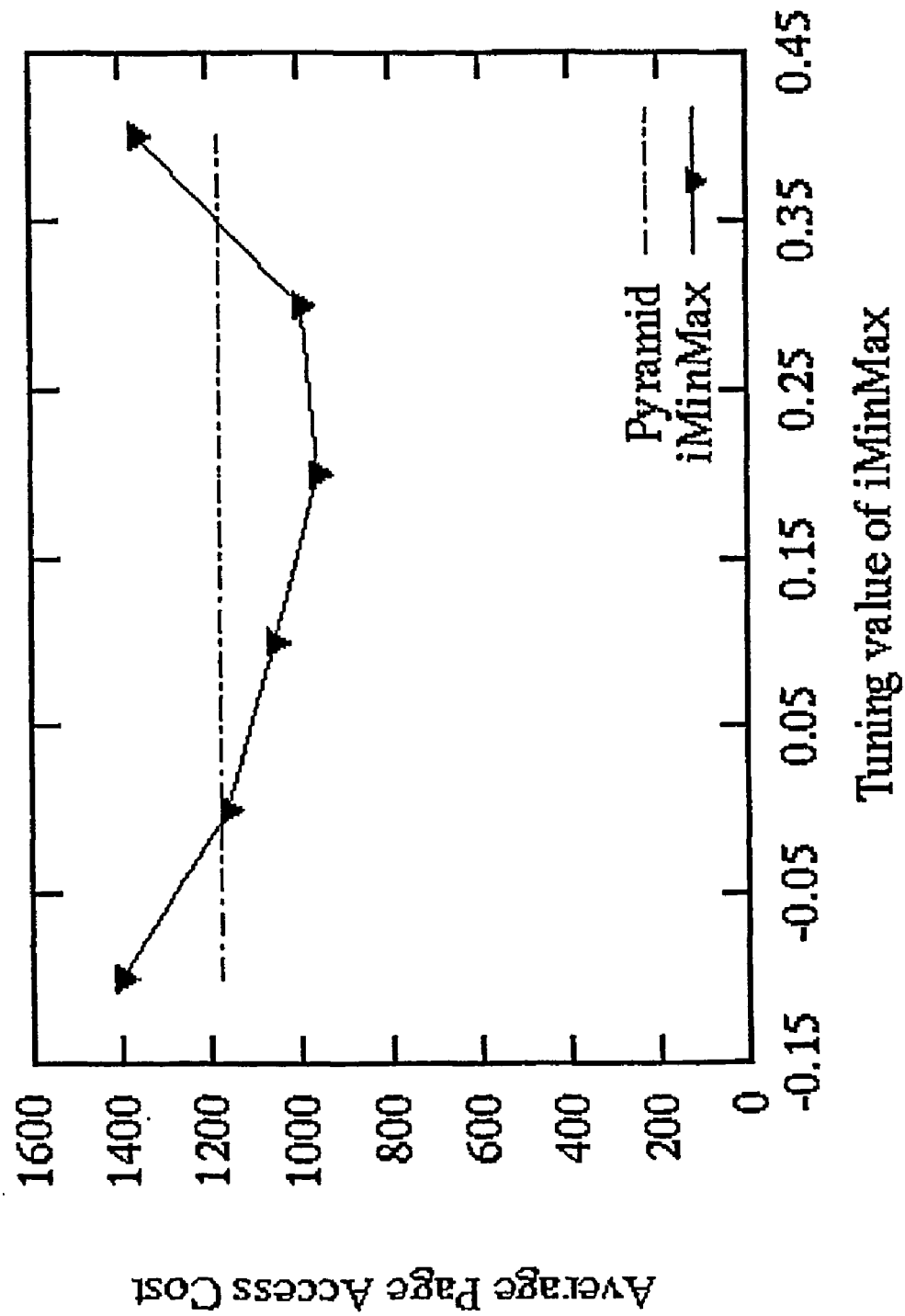
FIG. 10 is a graph illustrating efficiency results of an implementation of the present invention for high-dimensional data points having a skewed exponential distribution.

The second set of experiments looks at the relative performance of the schemes for skewed exponential data sets. As above, each dimension of the query is fixed to have a width of 0.4. For an exponential distribution (we choose to be exponential to small value), many dimensions will have small values, and a small number of dimensions will have large values. Thus, many data points will have at least one large value. Because many of the dimensions are associated with small values, the data points tend to lie close along the edges of the data space. We note that exponential data distributions can be very different from each other. They may be more likely to be close along the edges, or close to the different corners depending on the number of dimensions that are skewed to be large, or small. A range query, if it is with exponentially distribution characteristics, will have subqueries which are mostly close to the low corner. Therefore, tuning the keys to choose large values is likely to keep away more points from the query. FIG. 10 shows the results for 500K 30-dimensional points on a skewed exponential distribution. The result is of similar form to that of the normal distribution experiment—iMinMax is optimal at certain θ values.

Although the present invention has been described in considerable detail with reference to certain embodiments, it should be realized that numerous modifications are possible without departing from the spirit and scope of the invention. For example, although an exemplary implementation of the present invention has been described in which a B$^+$-tree is used as the underlying single-dimensional indexing structure, other single-dimensional indexing structures may be used.

The invention claimed is:

1. A method of managing a database which stores high-dimensional data items, comprising:
   (a) applying a transform function to a high-dimensional data item to map the high-dimensional data item to single-dimensional space, thereby obtaining a single-dimensional value which represents the high-dimensional data item;
   (b) indexing the single-dimensional value obtained by said applying step using a single-dimensional index structure; wherein
      (i) the high-dimensional data item includes a plurality of attribute values, each attribute value corresponding to a different dimension of the high-dimensional data item;
      (ii) said step of applying a transform function maps each attribute value of the high-dimensional data item to a predetermined range, thereby obtaining a mapped attribute value for each attribute value, and calculates the single-dimensional value which represents the high-dimensional data item as $d_{min}+x_{min}$ or $d_{max}+x_{max}$, where $x_{min}$ is the smallest mapped attribute value associated with the high-dimensional data item, $d_{min}$ is a value associated with the dimension which corresponds to the smallest mapped attribute value, $x_{max}$ is the largest mapped attribute value associated with the high-dimensional data item, and $d_{max}$ is a value associated with the dimension which corresponds to the largest mapped attribute value; and
      (iii) said applying and indexing steps are performed for a plurality of high-dimensional data items to form an indexed set of single-dimensional values; and
   (c) performing a search on the indexed set of single-dimensional values to retrieve a set of points, wherein said performing includes
   transforming a range query into a set of d subqueries in the single-dimensional space represented as $q_1, q_2, \ldots, q_d$, where $q_i=[I_i,h_i]$, $1 \leq i \leq d$ and for a jth query subrange in q, $[x_{j1},x_{j2}]$:

$$q_j = \begin{cases} [j+\max_{i=1}^d x_{i1}, j+x_{j2}] & \text{if } \min_{i=1}^d x_{i1} + \theta \geq 1 - \max_{i=1}^d x_{i1} \\ [j+x_{j1}, j+\min_{i=1}^d x_{i2}] & \text{if } \min_{i=1}^d x_{i2} + \theta < 1 - \max_{i=1}^d x_{i2} \\ [j+x_{j1}, j+x_{j2}] & \text{otherwise,} \end{cases}$$

where l is a tuning parameter, and
   evaluating each subquery in said set of subqueries using the single-dimensional index structure.

2. The method according to claim 1, wherein subqueries in said set of subqueries are pruned without performing said evaluating step.

3. The method according to claim 1, wherein the number of subqueries in said set of subqueries equals the number of dimensions in the high-dimensional data item.

4. An apparatus for managing a database which stores high-dimensional data items, comprising:
   (a) transform means for applying a transform function to a high-dimensional data item to map the high-dimensional data item to single-dimensional space, thereby obtaining a single-dimensional value which represents the high-dimensional data item;
   (b) indexing means for indexing the single-dimensional value obtained by said transform means using a single-dimensional index structure; wherein
      (i) the high-dimensional data item includes a plurality of attribute values, each attribute value corresponding to a different dimension of the high-dimensional data item;
      (ii) said step of applying a transform function maps each attribute value of the high-dimensional data item to a predetermined range, thereby obtaining a mapped attribute value for each attribute value, and calculates the single-dimensional value which represents the high-dimensional data item as $d_{min}+x_{min}$ or $d_{max}+x_{max}$, where $x_{min}$ is the smallest mapped attribute value associated with the high-dimensional data item, $d_{min}$ is a value associated with the dimension which corresponds to the smallest mapped attribute value, $x_{max}$ is the largest mapped attribute value associated with the high-dimensional data item, and $d_{max}$ is a value associated with the dimension which corresponds to the largest mapped attribute value; and
      (iii) said transform means and said index means are operable on a plurality of high-dimensional data items to form an indexed set of single-dimensional values; and
   (c) searching means for performing a search on the indexed set of single-dimensional values to retrieve a set of points, wherein said searching means is operable to transform a range query into a set of d subqueries in the single-dimensional space represented as $q_1, q_2, \ldots, q_d$, where $q_i=[I_i,h_i]$, $1 \leq i \leq d$, and for a jth query subrange in q, $[x_{j1},x_{j2}]$:

$$q_j = \begin{cases} [j+\max_{i=1}^d x_{i1}, j+x_{j2}] & \text{if } \min_{i=1}^d x_{i1} + \theta \geq 1 - \max_{i=1}^d x_{i1} \\ [j+x_{j1}, j+\min_{i=1}^d x_{i2}] & \text{if } \min_{i=1}^d x_{i2} + \theta < 1 - \max_{i=1}^d x_{i2} \\ [j+x_{j1}, j+x_{j2}] & \text{otherwise,} \end{cases}$$

where l is a tuning parameter, and to evaluate each subquery in said set of subqueries using the single-dimensional index structure.

5. The apparatus according to claim 4, wherein said searching means is operable to prune subqueries in said set of subqueries.

6. The apparatus according to claim 4, wherein the number of subqueries in said set of subqueries equals the number of dimensions in the high-dimensional data item.

* * * * *